(12) United States Patent
Dalton

(10) Patent No.: US 8,501,660 B2
(45) Date of Patent: Aug. 6, 2013

(54) CATALYST ADDITIVES

(75) Inventor: James Spencer Dalton, Reading (GB)

(73) Assignee: Johnson Matthey PLC, London (GB)

( * ) Notice: Subject to any disclaimer, the term of this patent is extended or adjusted under 35 U.S.C. 154(b) by 0 days.

(21) Appl. No.: 12/825,971

(22) Filed: Jun. 29, 2010

(65) Prior Publication Data

US 2010/0280274 A1 Nov. 4, 2010

Related U.S. Application Data

(62) Division of application No. 12/298,378, filed as application No. PCT/GB2007/050206 on Apr. 23, 2007.

(30) Foreign Application Priority Data

Apr. 28, 2006 (GB) .................................. 0608359.6

(51) Int. Cl.
*B01J 23/00* (2006.01)
(52) U.S. Cl.
USPC ............................ 502/300; 502/301; 502/159
(58) Field of Classification Search
USPC .......................................... 502/159, 300, 301
See application file for complete search history.

(56) References Cited

U.S. PATENT DOCUMENTS

| 3,310,870 A | 3/1967 | Parikh et al. |
| 3,989,863 A | 11/1976 | Jackson et al. |
| 4,155,943 A * | 5/1979 | Ofstead et al. ................ 585/274 |
| 4,867,857 A | 9/1989 | von Benda et al. |
| 2002/0028860 A1 | 3/2002 | Kerr et al. |
| 2002/0127196 A1 | 9/2002 | Avila et al. |

FOREIGN PATENT DOCUMENTS

| EP | 0 319 482 A2 | 6/1989 |
| EP | 1 159 057 | 12/2001 |
| JP | 09-225317 | 9/1997 |
| JP | 2002-537970 | 11/2002 |
| JP | 2003-68292 A | 3/2003 |
| JP | 2004-514778 A | 5/2004 |
| WO | WO-98/00257 A1 | 1/1998 |
| WO | WO-2006/063600 A1 | 6/2006 |

OTHER PUBLICATIONS

Pavel Kukula et al., "The kinetics of enantioselective hydrogenation of methyl acetoacetate using a modified Raney nickel catalyst," *Res. Chem. Intermed.*, vol. 29, No. 1, 2003, pp. 91-105.

* cited by examiner

*Primary Examiner* — Melvin Curtis Mayes
*Assistant Examiner* — Melissa Stalder
(74) *Attorney, Agent, or Firm* — RatnerPrestia

(57) ABSTRACT

A nickel slurry comprising a nickel catalyst, water and at least one rheology modifier, the activity of the nickel catalyst being equal to or greater than the activity of the equivalent nickel catalyst contained in a slurry which does not comprise rheology modifiers, wherein the at least one rheology modifier provides high viscosity at low shear stress and low viscosity at high shear stress.

5 Claims, 1 Drawing Sheet

CATALYST ADDITIVES

CROSS REFERENCE TO RELATED APPLICATIONS

This application is a divisional application of U.S. patent application Ser. No. 12/298,378, filed Oct. 24, 2008, which is the U.S. National Phase application of PCT International Application No. PCT/GB2007/050206, filed Apr. 23, 2007, and claims priority of British Patent Application No. 0608359.6, filed Apr. 28, 2006, the disclosures of all of which are incorporated herein by reference in their entirety for all purposes.

FIELD OF THE INVENTION

The present invention relates to a nickel slurry comprising a nickel catalyst, water and additives to improve the flow behaviour of the nickel slurry.

BACKGROUND OF THE INVENTION

Nickel sponge catalysts generally consist of milled polymorphic particles up to 20 micrometers in size. These particles are commonly sold in drums containing alkaline water and nickel at a weight ratio of approximately 90:85 (Ni: water). The catalyst must be contained in water as it is pyrophoric and can spontaneously combust if allowed to dry out in air. Such a catalyst in water system is known as a 'nickel slurry'.

Other compounds of nickel may be sold as catalysts for example nickel oxides, nickel halides, nickel complexes and nickel carbonyls but these are not generally provided as slurries.

Not all nickel compounds (including those listed above) will be suitable for use as a catalyst since certain properties of any material are key as to whether it is able to perform as a catalyst. Such properties include the requirement that the material has a clean surface and a high surface area thereby to enable the reactants to access the surface of the catalyst.

Nickel particles in a nickel slurry tend to settle within the container in which they are housed, e.g. a drum, due to the high density of nickel compared to water (density of nickel=9 g cm$^{-3}$, density of water=1 g cm$^{-3}$). These particles may even form a dense cake of sediment. Banging and vibration of the nickel slurry container, such as might occur during transportation, appears to make the cake more dense. The settling of the nickel catalyst makes it difficult to pour or remove from the drum, this poor flow behaviour being especially problematic due to the pyrophoric nature of the dry catalyst.

WO 2006/063600 relates to adjusting catalysts' and catalyst precursors' suspension and settling properties using rheology modifiers, and concentrates on using rheology modifiers that speed up the rate of settling with nickel catalysts.

SUMMARY OF THE INVENTION

We have now found, surprisingly, that additives may be used to improve the flow behaviour of the nickel slurry without detrimentally affecting the activity of the nickel catalyst.

According to one aspect, the invention provides a nickel slurry comprising a nickel catalyst, water and at least one rheology modifier, characterised in that the activity of the nickel catalyst is equal to or greater than the activity of the equivalent nickel catalyst contained in a slurry which does not comprise rheology modifiers, wherein the at least one rheology modifier provides high viscosity at low shear stress and low viscosity at high shear stress.

BRIEF DESCRIPTION OF THE DRAWINGS

Aspects of the invention will be described with reference to the drawing, in which:

FIG. 1 is a photograph of a sample of nickel slurry containing a rheology modifier, taken 16 hours after shaking.

DETAILED DESCRIPTION OF THE INVENTION

Rheology modifiers are used to alter the flow characteristics of a material. We have found that to improve the flowability of the nickel slurry, it was necessary to have a continuous dispersion with very high viscosity at low shear stress, and low viscosity at high shear stress. This is sometimes referred to as pseudoplasticity and results from the structure of the rheology modifier forming a network at low shear stress that breaks down under high shear stress. (Note the rheology modifiers used in this invention are used to modify the flow characteristics of the nickel slurry itself, not to modify the flow characteristics of the dry nickel catalyst prior to slurry formation.) These characteristics enable the nickel particles to be suspended when at rest, thereby avoiding the formation of a dense cake of catalyst, but also allow the viscosity of the solution to drop when being poured, enhancing flowability and allowing the catalyst to be readily transferred from its container. Certain polymers and emulsions can be used to increase the viscosity of aqueous slurries and dispersions, including: polysaccharides, celluloses, hydrophobically modified alkali-swellable emulsions and polyhydroxycellulose derivatives, such as Xanthan gum and Rheovis 152 (Ciba Speciality Chemicals).

A nickel slurry according to the invention may comprise from $1 \times 10^{-3}$ wt % to 3 wt % rheology modifiers relative to the total weight of the slurry.

Typically the nickel slurry will be alkaline, e.g. pH=11. We have found that Rheovis 152 is useful as a rheology modifier for nickel slurry as it is at its most efficient at approx. pH 11.

EXAMPLES

In order that the invention may be more fully understood the following Examples are provided by way of illustration only and with reference to the accompanying drawing, in which:

Example 1

Nickel Catalyst Sample Treated with Rheology Modifiers

Example 1a 46 grams of a nickel catalyst slurry was placed in a jar and shaken. To this slurry 0.16 grams of Xanthan gum (CP Kelco, Kelzan HP) was added and the contents of the jar stirred for 20 minutes. On cessation of stirring, the nickel particles did not form a sediment. Furthermore, 16 hours after cessation of stirring no sedimentation of nickel particles could be seen (see FIG. 1).

Example 1b

The experiment described in Example 1a was repeated using 0.46 grams of Rheovis 152 (containing 0.18 grams active ingredient) in place of the Xanthan gum. Only a minimal amount of sedimentation was observed, directly after cessation of stirring and 16 hours later.

Example 2

Comparative Activity of Treated Nickel Catalysts

A nickel catalyst sample prepared according to Example 1a was tested for its activity in a hydrogenation reaction. Catalytic hydrogenation converts a cyano-precursor into the corresponding methylamino substituent. Side products of the reaction may arise such as unknown materials, and secondary products from uncatalysed reactions of the product (see impurity 1 below).

Each catalyst sample was shaken to allow a representative sample to be taken, then 2×1.4 grams of suspended catalyst was weighed into 2 tubes. To each tube 1.0 grams of cyano-substituted precursor, 7 ml methanol and 0.1 ml '880' ammonia was added. The tubes were then sealed in a Baskerville multi-well autoclave and the apparatus purged three times with argon then 3 times with hydrogen before being pressurized to 4.5 bar hydrogen and heated to 40° C. The reaction mixture in each of the tubes was stirred and heated under constant pressure of hydrogen (maintained by a Buchi press-flow controller) overnight, the apparatus was then allowed to cool under hydrogen and finally the pressure within the autoclave was vented and the samples recovered. Samples from each tube were filtered and diluted 1:1 with water for analysis by HPLC.

HPLC Conditions:

Equipment: Agilent 1100

Column: YMC basic, 25×0.46 cm

Column temperature: 35° C.

Eluent: Either 33/67 MeOH/$H_2O$ or 27/73 MeOH/$H_2O$ containing 0.005 M $Na_2HPO_4$ acidified with $H_3PO_4$ to pH 2

Flow rate: 1 ml/min

Injection vol: 20 microlitres

Detection: Refractive index, 35° C.

Results:

| Sample | Product 1 | Product 2 | Starting Material | Impurity 1 |
|---|---|---|---|---|
| Example 1a (unmodified) | 5 | 6 | 69 | 20 |
| Example 1a (modified) | 16.2 | 12.8 | 45 | 25 |

As can be seen the nickel catalyst sample treated with the rheology modifier did not show a reduced catalytic activity relative to the untreated sample. In fact the activity of the nickel catalyst sample treated with the rheology modifier appears to have increased, as evidenced by the increased conversion of starting material (note: Product 1 and Product 2 may be combined during further processing).

What is claimed:

1. A process for catalysing a reaction comprising the step of adding to a reaction vessel:
   (i) a pre-formed nickel slurry catalyst suspension comprising a nickel catalyst, water and at least one rheology modifier, wherein the activity of the nickel catalyst is equal to or greater than the activity of an equivalent nickel catalyst contained in a slurry which does not comprise rheology modifiers, wherein said slurry exhibits pseudoplasticity, and wherein the nickel slurry catalyst suspension comprises from $1\times10^{-3}$ wt % to 3 wt % rheology modifiers relative to the total weight of the suspension; and
   (ii) at least one reactant to convert the at least one reactant into a product.

2. The process for catalysing a reaction according to claim 1, wherein the at least one rheology modifier is selected from the group consisting of polysaccharides, celluloses, hydrophobically modified alkali-swellable emulsions, polyhydroxycellulose derivatives and any combination thereof.

3. The process for catalysing a reaction according to claim 1, wherein the nickel slurry catalyst suspension is alkaline.

4. The process for catalysing a reaction according to claim 1, wherein the reaction is a hydrogenation reaction.

5. The process for catalysing a reaction according to claim 1, wherein the catalyst is pyrophoric when dry.

\* \* \* \* \*